Patented Nov. 2, 1943

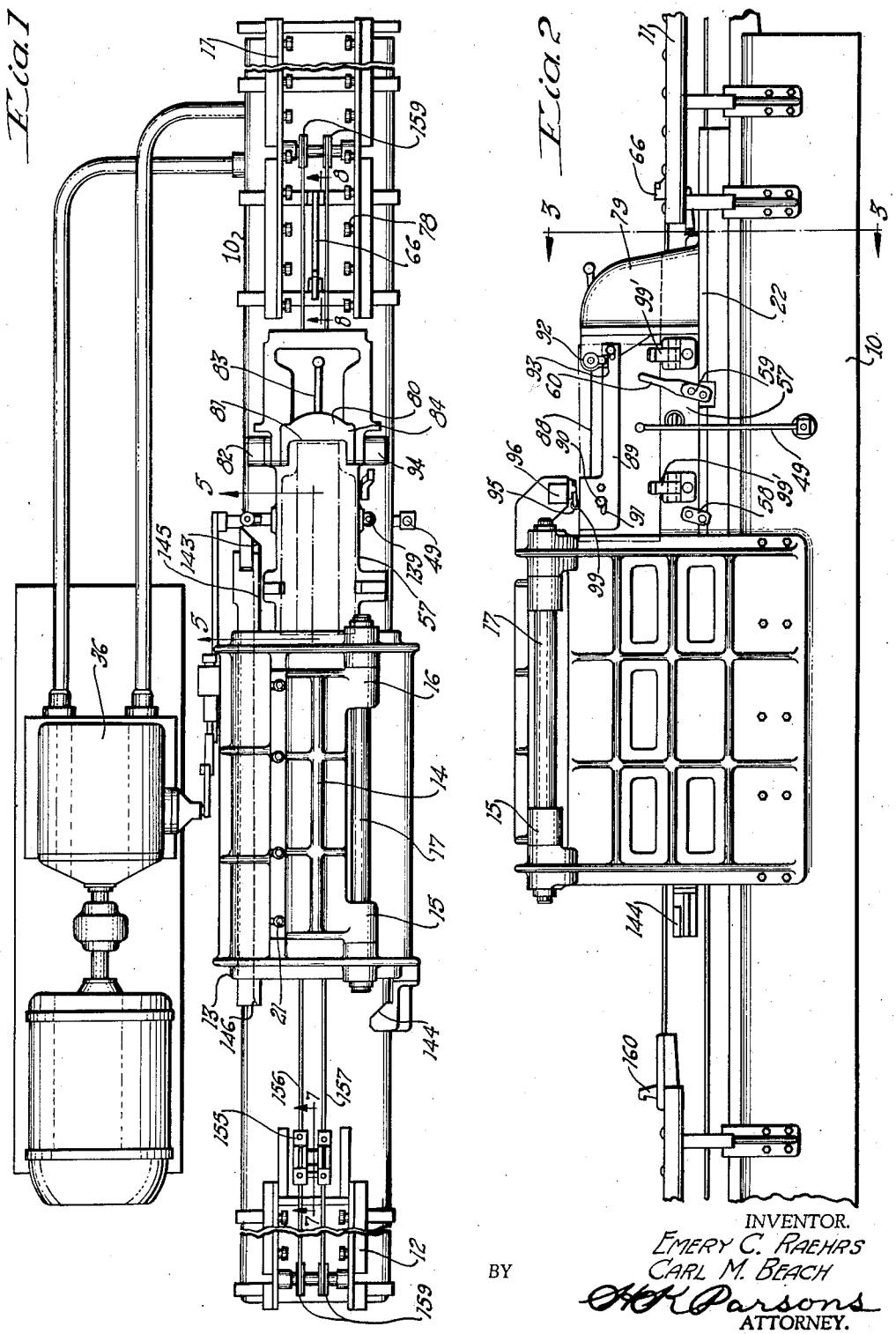

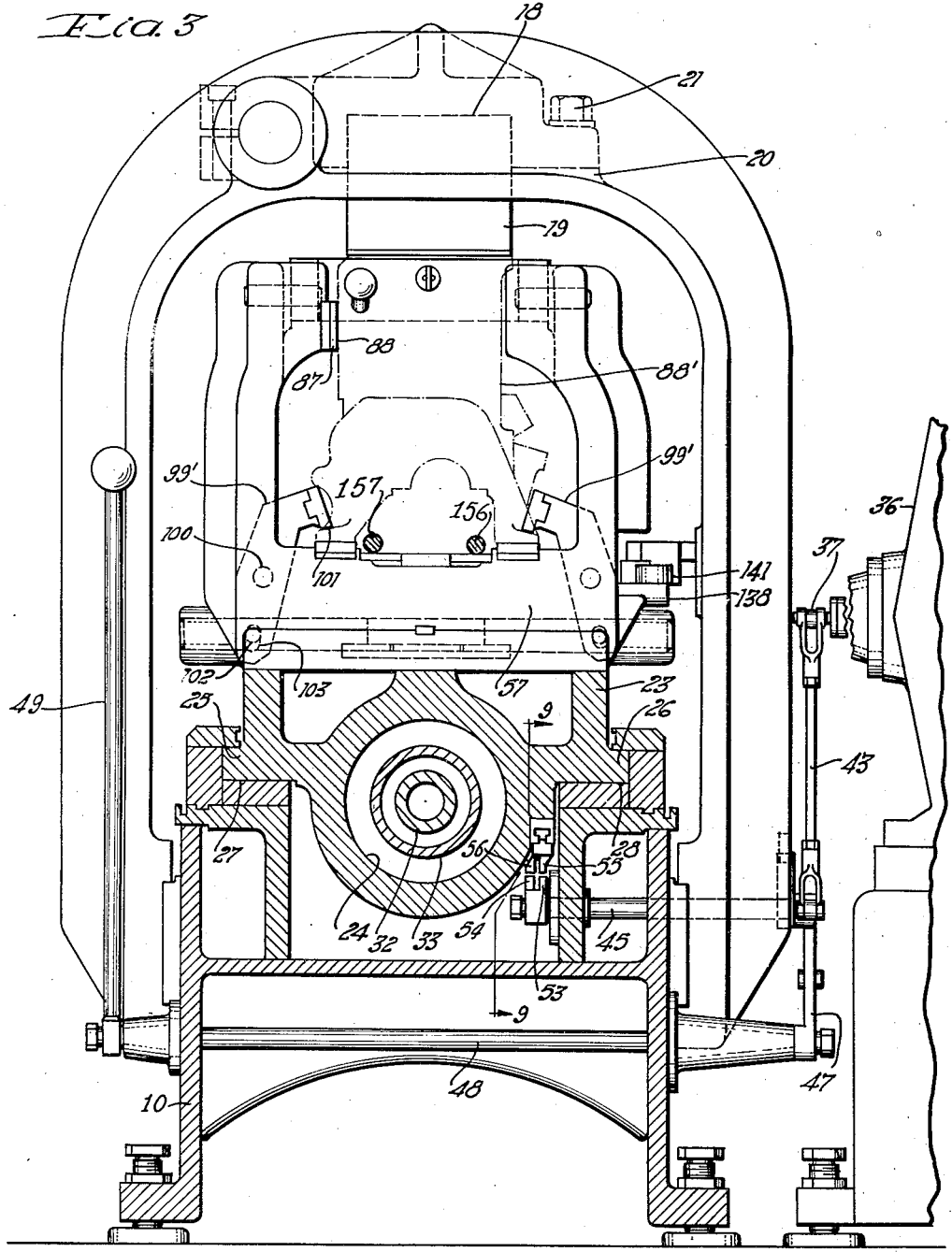

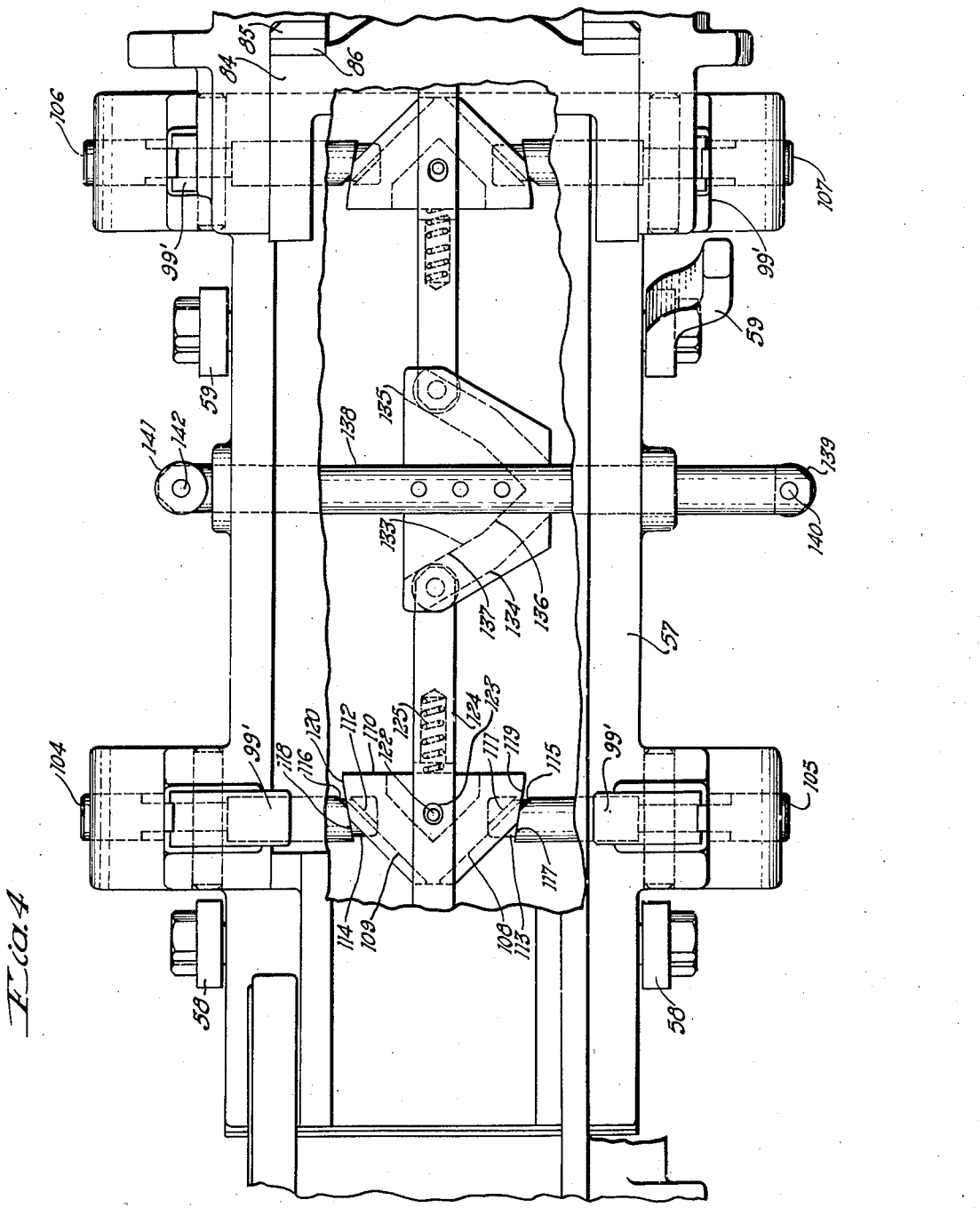

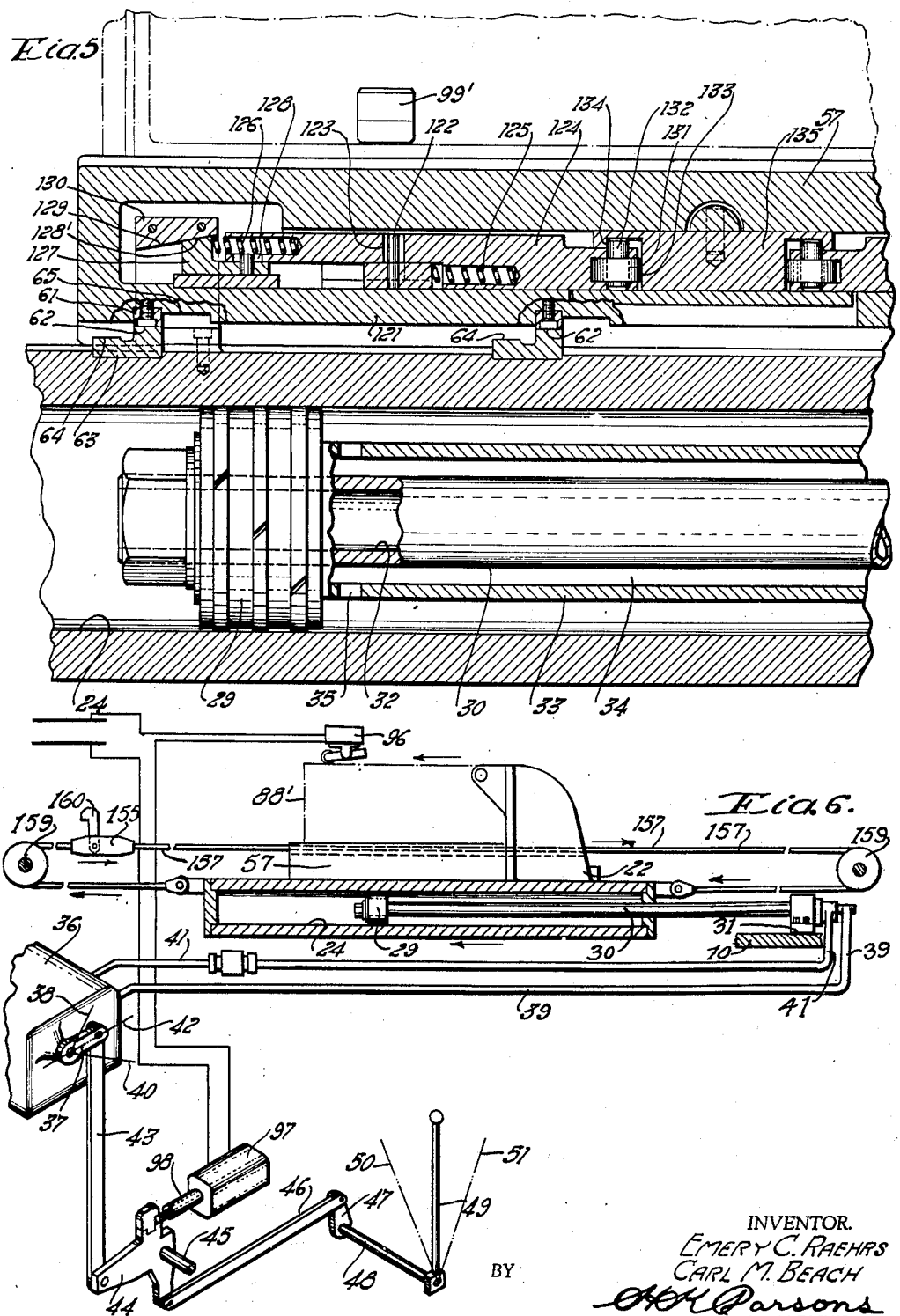

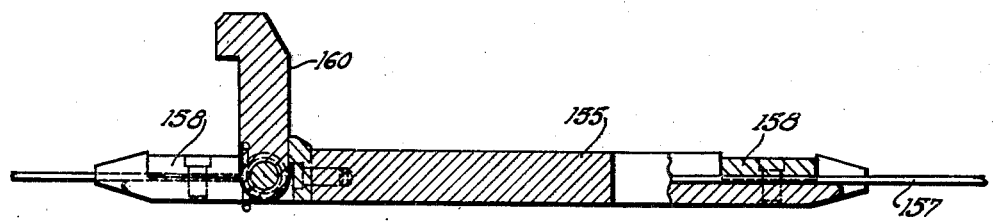
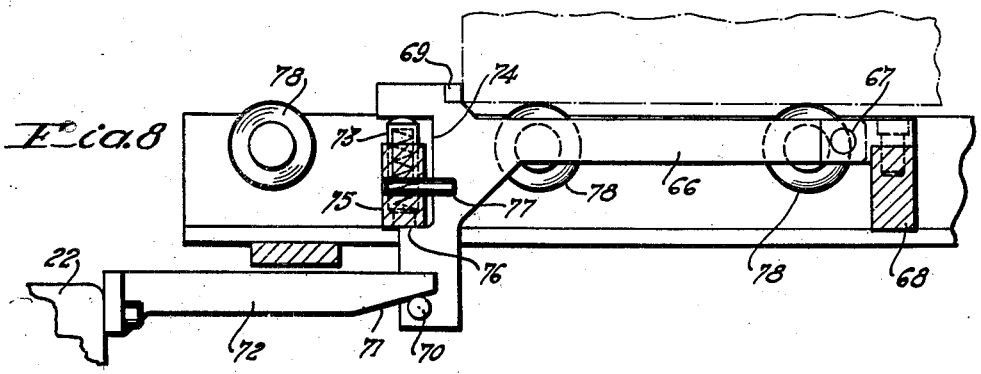
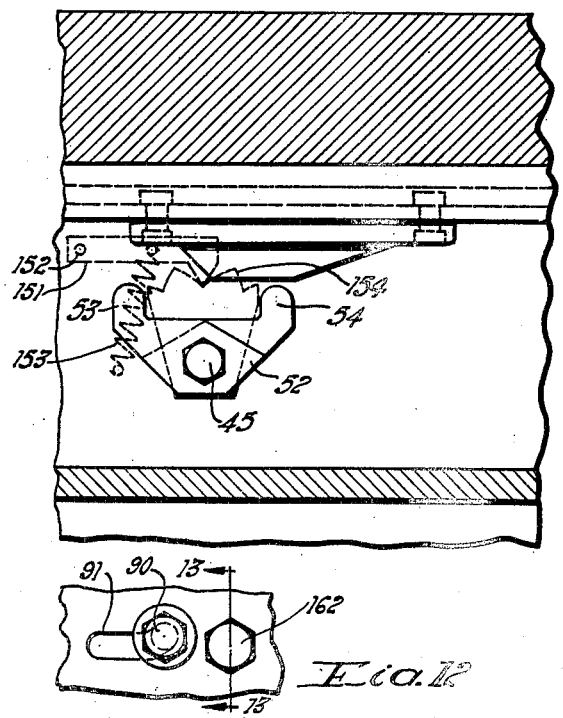
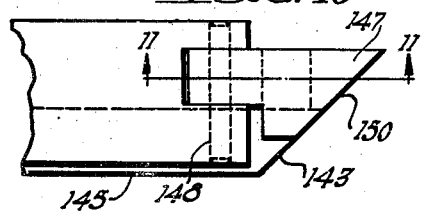
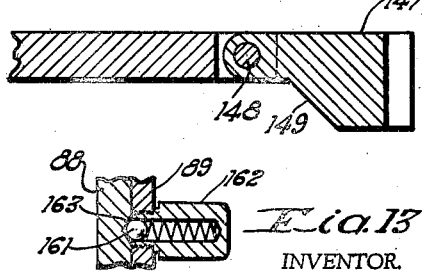

2,333,337

UNITED STATES PATENT OFFICE 2,333,337

BROACHING MACHINE

Emery C. Raehrs and Carl M. Beach, Cincinnati, Ohio, assignors to The Cincinnati Milling Machine Co., Cincinnati, Ohio, a corporation of Ohio Application July 31, 1939, Serial No. 287,500

11 Claims. (Cl. 90—33)

This invention relates to machine tools and more particularly to improvements in broaching machines.

One of the objects of this invention is to provide a broaching machine which may be incorporated in the conveyor line of a high production system whereby the movements necessary for machining also constitute a part of the progress along the conveyor line.

Another object of this invention is to provide a broaching machine in which the idle return movement is utilized for removing the work from the machine and depositing it on a live part of the conveyor system.

A further object of this invention is to provide a simple and efficient work carrier for receiving and feeding the work through the machine including means for automatically clamping and unclamping the work at the beginning and the end respectively of the feeding stroke whereby work will flow through the machine in streamline fashion.

A still further object of this invention is to provide a tunnel type broaching machine having broaching tools set in a removable portion of the tunnel wall to facilitate inspection and replacement.

Still another object of this invention is to provide an improved work carrier which may be readily adjusted to position a corresponding surface on work of different heights in the broaching plane of the machine.

An additional object of this invention is to provide suitable interlocks between the work fixture and the power control system to insure that the work is properly positioned and secured before power is applied to the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a plan view of a machine embodying the principles of this invention.

Figure 2 is a side elevation of the machine shown in Figure 1.

Figure 3 is a vertical section through the machine as viewed on the line 3—3 of Figure 2.

Figure 4 is a plan view of the work fixture with certain parts broken away to show the work clamping mechanism.

Figure 5 is a vertical section through a portion of the base of the work fixture as viewed on the line 5—5 of Figure 1 showing further details of the work fixture.

Figure 6 is a diagrammatic view showing the electrical interlock between the work fixture and the power control means.

Figure 7 is an enlarged section through the unloading block as viewed on the line 7—7 of Figure 1.

Figure 8 is an enlarged view of the work stop as viewed in the line 8—8 of Figure 1.

Figure 9 is a detail view of the trip lever.

Figure 10 is a detail plan view of the same gate.

Figure 11 is a section on the line 11—11 of Figure 10.

Figure 12 is an enlarged detail view of the cam slot in the stop bar.

Figure 13 is a detail section on the line 13—13 of Figure 12.

Referring to Figures 1 and 2 of the drawings, the reference numeral 10 indicates, in general, the bed of the broaching machine having upon one end a receiving conveyor, indicated generally by the reference numeral 11, upon which work is stored while awaiting process by the machine; and having upon the other end a delivery conveyor, indicated generally by the reference numeral 12, from which the work is automatically delivered to a live conveyor line of a production system.

It will be noted that the conveyors are in alignment with the machine whereby the entire assembly may be inserted in the conveyor line of any production system.

A tool supporting tunnel 13 is supported intermediate the length of the bed by attachment to the side walls of the bed. This tunnel has a removable tool carrier portion indicated by the reference numeral 14, which is hinged at 15 and 16 on a pintle 17. As shown in Figure 3, the tool carrier 14 is provided with a rectangular slot 18 in which the broaching tool unit 19 is secured and clamped by suitable means. The tool carrier is supported in cutting position by the pintle 17 on the one side and by the flat surface 20 on the other side, the surface 20 being a fixed part of the tunnel. The tool carrier is clamped in position by a series of bolts 21.

The work is moved from the storage conveyor 11 into a movable work carrier indicated generally by the reference numeral 22. This carrier has a base 23 as indicated in Figure 3 in which is formed a cylinder 24, and upon opposite sides of the cylinder are guide rails 25 and 26. These guide rails slide in guide ways 27 and 28 which are fixed with and form a portion of the bed 10.

Referring to Figure 5, the cylinder 24 contains a piston 29 which is connected by a double tubular piston rod indicated generally by numeral 30 to a fixed portion 31 of the bed, Figure 6.

The piston comprises an inner tubular portion 32 through which fluid is delivered to the left end of cylinder 24, and an outer tubular member 33, whereby an annular space 34 is provided between the inner and outer members through which fluid is delivered to the right hand end of cylinder 24, the fluid escaping through radial apertures 35.

Since the volumetric space in the left end of the cylinder is much greater than in the right end of the cylinder, on account of the space occupied by the piston rod, fluid is delivered through the inner tube 32 to effect the feeding movement, and the same volumetric rate of fluid is delivered through the annular space 34 to effect the return movement which will result in the return movement being much faster than the feeding movement.

The cylinder is supplied with fluid from a reversible variable delivery pump 36, which may be of known commercial type, having a control lever 37 which when thrown to the position indicated by the dash and dot line 38 in Figure 6 will cause the pump to deliver fluid to channel 39 and thereby to the inner tube 32 to effect feeding movement, and when thrown to the position indicated by the line 40, will cause the pump to deliver fluid to channel 41 and thereby through the space 34 to the right hand end of the cylinder to effect the return movement.

The pump control lever 37 may also be moved to a neutral position, indicated by the line 42, in which the pump will merely idle.

The pump control lever 37 is connected by a link 43 to a bell crank 44 which is secured to the end of a shaft 45, rotatably supported in the bed of the machine as indicated in Figure 3.

The bell crank is also connected by a link 46 and crank 47 to a control shaft 48 having a manual control lever 49 secured to the end thereof. Thus, the pump control 37 may be positioned to effect a feeding movement by throwing the control lever to the position indicated by the reference numeral 50, or to effect a rapid return movement by throwing the lever 49 into the position indicated by the numeral 51.

The shaft 45 is adapted to be trip controlled for automatic stopping and to this end is provided with a double-ended crank 52, Figure 9, which has spaced offset actuating portions 53 and 54 which lie in the path of dogs 55 and 56 respectively carried on the underside of the base 23 as shown in Figure 3.

When the lever 49 is thrown to the position 50, the portion 53 is raised into the path of the dog 55 which is adjustably positioned to depress the portion 53 at the end of the feeding stroke and thereby rotate the shaft 45 into a position to neutralize the pump. The operator then throws the lever to the position indicated by the line 51 to effect the return movement which will be terminated when the dog 56 depresses the portion 54.

The traveling work support also includes a vertically adjustable sub-support or floor 57 which is connected to the base 23 by pairs of parallel links indicated by the reference numerals 58 and 59 in Figure 2. These links have a pivotal connection at each end to the parts 23 and 57 and thereby form a parallelogram whereby the top work supporting surface will remain parallel to the cutting plane of the machine in each position of adjustment. The link 59 is provided with a manually operable handle 60 for positioning the sub-support in either one of two vertical positions to accommodate work of two different heights. In order to insure a solid support during cutting, the sub-support is provided with a series of hardened shoes indicated by the reference numeral 61 in Figure 5 which rest upon surfaces 62 of the stepped blocks 63 fixed to the base 23 when in its upper position; and on surfaces 64 of the blocks 63 when in its lower position. The underside of the sub-support is cut away at 65 to provide clearance for the surfaces 62.

The sub-support carries self-contained means for automatically clamping a work piece thereto at the beginning of the feeding or broaching stroke. This mechanism is more particularly shown in Figures 4 and 5 of the drawings.

The work comes to the machine on the receiving conveyor 11 which is provided with a removable stop, Figure 8, that serves to store work on the conveyor until the machine is ready to receive it. This stop comprises a lever 66 which is pivotally connected by a pin 67 to a fixed block 68. The lever carries a hardened insert 69 which is adapted to engage the end of the work and prevent further movement thereof.

The lever is also provided with a laterally extending pin 70 which is adapted to be engaged by the inclined cam surface 71 formed on the end of a finger 72 projecting rearwardly from the work carrier 22. As the work carrier returns, the cam surface forces the lever 66 downward against the resistance of a spring actuated pin 73. The lever 66 has a rectangular slot 74 cut in the end thereof for embracing opposite sides of a fixed block 75 in which the spring pressed pin 73 is mounted. The lower face 76 of the slot engages the under side of the block 75 for limiting upward movement. Lateral play of the lever 66 is prevented by a pair of pins 77 which are driven into the block 75 in a position to engage opposite sides of the lever 66. Thus, when the work carrier returns to its starting position the finger 72 automatically removes the stop 66 whereby the work piece is free to be moved into the machine on the rollers 78. The work is moved from the conveyor on to the work carrier between two upright stanchions 79 which serve to pivotally support a back stop 80.

The back stop 80 is U-shaped having an internal flat face 81 for engaging the end of a work piece, and this face is behind the axis of rotation 82 whereby when the member 80 is elevated by the lever 83 it will move out of the path of the work so that the work may pass underneath it. After the work has passed, the stop is lowered into position and a pair of laterally extending ears 84 engage pads on the stanchions 79 for supporting the end stop in position. The end thrust on the work is taken by the stanchions 79, and to prevent wear the stanchions are provided with hardened inserts 85, which engage hardened inserts 86 attached to the end stop as shown in Figure 4.

Referring to Figure 3, the work carrier is provided with a hardened lateral guide 87, and after the end stop has been lowered into position the work is pushed back into the corner formed by the guide surface 81 on the end stop and the lateral guide 87. The lateral guide 87 engages a finished surface 88 which has been preformed on the work piece 88' shown in phantom. These two guides thus serve to position the work in the fixture in two directions, while the adjustable floor serves to position the work in a third direction.

An interlock has been provided to prevent starting of the machine if the end stop is not in proper position or if the adjustable floor has not been properly positioned for the height of the work piece. In other words, the machine is adapted to handle work of two different heights and if the floor has been elevated with the larger work piece on it the top of the work would be too high for the broaching tools and a wreck would result.

In order to prevent this, a stop bar 89 is supported on the side of the carrier, as shown in Figure 2, by a pair of bolts 90 which pass through elongated slots 91 formed in the bar. These slots have end portions lying in different planes for determining different elevations of the stop bar as indicated in Figure 12. This bar is longitudinally shifted by a crank 92 which engages a slot 93 cut in the upper surface of the bar and the crank is secured to the end of a pin 94 which is fixed with the back stop for rotation therewith. As the back stop is raised, the crank 92 is rotated in a counterclockwise direction which moves the stop bar 89 to the right.

This causes the stop bar to be elevated, thereby actuating the trip lever 95 of a limit switch 96 closing a circuit to the solenoid 97, the latter being shown in Figure 6. When this solenoid is energized the armature 98 is projected to prevent rotation of the bell crank 44 in a direction to start the feeding movement of the work carrier. The switch lever 95 has a roller 99 which is made wide enough so that one-half of it will ride on the top of the stop bar 89, and the other half will overlap on the work piece.

When the back stop is rotated clockwise into its working position the stop bar 89 is shifted longitudinally and simultaneously lowered, thereby permitting the limit switch to open. It will be apparent, however, that if the work piece is too high that the limit switch control lever will not be able to move downward due to the overlap of the roller on the work and therefore the solenoid will remain energized. If the work is of the proper height then the operator can rotate the control lever 49 to start the feeding movement of the work carrier.

A predetermined amount of lost motion is provided between the crank arm and the stop bar to insure that the stop bar is not shifted until near the end of the downward movement of the back stop. A detent is, therefore, provided for holding the stop bar in position while the lost motion is being taken up. This detent is shown in Figures 12 and 13, and comprises a spring pressed ball 161 mounted in a holder 162 carried by the stop bar 89 and engageable with a detent 163 formed in the side 88.

As the work carrier starts its forward movement four pivotally mounted clamps 99' are automatically actuated to clamp the work to the carrier. As shown in Figure 3, the clamps 99' are pivotally mounted on pins 100 carried by the sub-support 57 of the carrier. One end of each clamp is provided with a hardened insert 101 which engages the work, while the other end is bifurcated for connection to an actuating plunger by means of a cross pin 102. The cross pin extends into a radial elongated slot 103 formed in the end of the clamp 99' to provide clearance due to the arcuate movement of the clamp member. Referring to Figure 4, there are four actuating plungers 104, 105, 106 and 107 slidably mounted in the sub-support 57 and operatively connected to the respective clamps. The plungers 104 and 105 are arranged in a pair with their adjacent ends engaging camming ribs 109 and 108 respectively formed on the underside of a cam member 110. It will be noted that the ribs extend at an angle of about 45 degrees to the direction of movement of the plungers. When member 110 is moved toward the right, as viewed in Figure 4, the ribs 108 and 109 engage the angular faces 111 and 112 of slots 113 and 114 formed in the ends of the plungers, and thereby pull the plungers toward one another to effect unclamping of the work. When the cam 110 is moved in the opposite direction or toward the left, as viewed in Figure 4, the ribs 108 and 109 engage angular faces 115 and 116 to effect an outward rapid movement of the plungers and thereby rapid movement of the clamping members 99' into clamping position. The faces 115 and 116 are cut away to form surfaces 117 and 118 which are of a low angle and engageable by corresponding surfaces 119 and 120 on the cam 110 for effecting a high pressure wedging or clamping action to effect final clamping of the work.

It will be noticed that when the low angle surfaces 117 and 119 are in engagement that a large movement of the cam member 110 effects a small movement of the clamping members. The cam 110 is supported on the bottom plate 121 of the sub-support 57, and the cam carries a pin 122 which extends into an enlarged hole 123 formed in a longitudinally movable link 124. A spring 125 is interposed between the link 124 and the cam 110 for urging the cam in a direction to remove normally lost motion between the pin 122 and one end of the slot 123.

A second spring 126 is interposed between the end of the link 124 and a wedge block 127, the latter having a lost motion connection at 128 consisting of a pin and elongated slot with the link 124. The wedge block 127 has a tapered surface 128' engaging a tapered surface 129 formed on the underside of a block 130 which is fixed with the bed 23. The link 124 has a roller 131 mounted in the bifurcated end thereof and a pin 132 which serves to hold the roller in the bifurcated slot, projects beyond one side of the link whereby the periphery of the roller may engage one cam surface 133 and the periphery of the pin may engage an opposing cam surface 134 on a crosswise moving actuator 135.

By referring to Figure 4 it will be noted that the cam surface 133 has a high angle portion 136 and a lower angle portion 137 whereby upon movement in one direction the surface 136 will effect a rapid movement of the link and then a slow movement to effect clamping and upon movement in the other direction the cam surface 134 will act on the end of the pin 132 to effect retraction of the link 124 and thereby release of the clamping member.

A duplicate of this mechanism is provided for actuating the plungers 106 and 107 and repetition of the description is not believed to be necessary. The member 135 has an actuating plunger 138 secured to it and projecting beyond opposite sides of the carrier, one end of the plunger having a roller 139 mounted in the bifurcated end thereof and held for rotation therein by a pin 140. The other end of the plunger 138 has a roller 141 attached to the upper side thereof by a pin 142 so as to project above the top surface of the plunger.

As the carrier feeds toward the left, as viewed in Figure 1, the roller 141 engages a cam 143 which forces the plunger 138 in a direction to effect clamping of the work and actuation of the wedge blocks 127 which clamps the sub-support 57 into tight engagement with the bed 23. When the work carrier emerges from the tunnel after the broaching operation, a second cam 144 engages the roller 139 and forces the plunger 138 in the opposite direction to effect unclamping of the work. At this time the roller 141 has passed beyond the end of a long rail 145 and this rail has a beveled end 146 for engaging the roller 141 upon the return movement of the carrier whereby the plunger 138 is held in a work unclamping position during return movement of the carrier through the tunnel. In order that the roller 141 may again be actuated by the cam 143, the rail 145 is provided with a gate 147 which is pivotally supported on a pin 148 as shown in Figures 10 and 11. As the roller returns it engages the beveled underside 149 of the gate 147 and lifts it so that the roller may pass through. After the roller has passed beyond the gate, it drops into position to present the cam surface 150 to the roller upon its next advancing movement.

It will now be evident that with the work in proper position in the carrier the operator throws the lever 49 into a feeding position and the carrier is hydraulically fed through the tunnel to effect a broaching operation. As it enters the tunnel the work is automatically clamped and as the carrier emerges from the tunnel the work is automatically unclamped. As shown in Figure 9, a detent mechanism is provided for holding the starting lever 49 in a running position. This mechanism comprises a detent lever 151 which is pivotally mounted at 152 on the fixed part of the machine and a spring 153 continuously urges the lever into engagement with a notched detent plate 154 keyed to the shaft 45. The plate is provided with three notches to correspond to the three positions of the control lever.

When the shaft 45 is rotated to its feed forward position the actuation portion 53 of the trip lever 52 is rotated clockwise as viewed in Figure 9 into the path of dog 53 whereby at the end of the feeding stroke the dog will rotate the shaft and thereby position the pump control in a neutral position and thereby automatically stop the feeding movement.

Means are provided for automatically unloading the work during the return movement of the work carrier and the unloading mechanism is connected for actuation by the carrier during its idle return movement.

This mechanism comprises an unloading block 155, shown in detail in Figure 7. The block is H-shaped, having longitudinal members provided with grooves for receiving cables 156 and 157. The two cables are clamped to the block by clamping members 158. The cables are stretched over pulleys 159 rotatably supported on the conveyor cradles and the ends of the cables are secured to the carrier 22, Figure 6.

Thus, when the carrier moves toward the left on its feeding stroke, the unloading block is moved toward the right or toward the conveyor, and it is so positioned that a work engaging finger 160 which is resiliently held in an upright position, Figure 7, will snap under the work so that upon return movement of the carrier the finger will move the work in a direction opposite to the direction of movement of the carrier and thereby move the work onto the live part of the conveyor system. In other words, as the work carrier finishes its feeding movement the unloading block is advanced into a position to engage the work and then the machine is automatically stopped. The operator throws the control lever 49 into its return position and the carrier moves in one direction while the cables operate on the unloader to pull the work in an opposite direction off of the carrier and onto the live part of the conveyor system.

Thus, without any attention on the part of the operator the work is automatically unclamped and then automatically unloaded. When the carrier reaches its return or starting position the dog 58 engages the portion 54 of the trip lever and stops the return movement, at which time the finger 72 has depressed the stop 66 so that the operator may move the next work piece onto the carrier.

There has thus been provided an improved broaching machine which is so constructed that it may be placed in the conveyor line of a high production system and constructed in a manner to readily receive work from the conveyor system, machine it and transmit it onto the conveyor system without any lost motion and in a highly efficient manner.

What is claimed is:

1. In a broaching machine having a broaching tool support and a work support, the combination of power means for effecting relative advance movement between the supports to effect a broaching operation, control means effective on said power means for producing a relative return movement between the supports, and means deriving power from the returning support to slide the finished work piece from the work support.

2. In a machine tool having a tool support and a traveling work support, the combination of power operable means for feeding said work support relative to the tool support to effect a machining operation on a work piece carried by the work support and for rapidly returning the work support, an unloading block having means engageable with a work piece carried by the work support at the end of the feeding stroke, and motion transmitting connections from the work support for causing movement of the unloading block in the opposite direction with respect to the movement of the returning work support to effect automatic unloading of the work support.

3. In a broaching machine having a broaching tool support and a work support, the combination of power operable means for feeding the work support and a work piece carried thereby in one direction past the tool support, and additional means actuated by said power operable means for continuing the movement of the work piece in the same direction while effecting a return movement of the work support.

4. In a broaching machine having a bed, a tunnel supported on said bed and having a broaching tool supported interiorly thereof, a work carrier slidably mounted on said bed for movement through said tunnel, hydraulically operated means for reciprocating the work carrier, a work unloading block having means for engaging a work piece on the carrier, motion transmitting means connecting the carrier to the unloading block in a manner to effect movement of the block in a direction opposite to the movement of the carrier whereby a work piece will be removed from the carrier during the return movement thereof.

5. In a broaching machine having a bed, and a work carrier and a cutting tool supported thereon, the combination of an adjustable sub-support mounted on the work carrier for positioning work of variable dimensions in the cutting plane of said tool, means to lock said sub-support in a plurality of positions in accordance with the dimension of the work, power operable means for effecting relative movement between the carrier and the tool including a starting control, and means responsive to the height of the work for preventing movement of the starting control if the sub-support is improperly positioned.

6. In a broaching machine having a support and a surface broaching tool fixed to said support, the combination of a work carrier having work supporting means lying in a plane parallel to the cutting plane of the broaching tool, means to adjust said work supporting means toward and from said cutting plane whereby work pieces of different heights may be broached with the same broaching tool, power operable means for effecting relative movement between the tool and work, and means to prevent operation of said power operable means if the height of the positioned work exceeds a prescribed amount.

7. In a broaching machine having a tool support, a work support and power operable means for effecting relative movement between the supports, the combination with a starting control lever for said power operable means, of means to prevent shifting of said lever to a running position, including a control member, a backstop mounted on the work support and movable into position behind the work for absorbing the cutting thrust thereon, and means supporting said control member in a position to be responsive to the height of the work and to the position of said backstop.

8. A broaching machine of the character described, including a hollow frame providing a work receiving tunnel, means for translating work to be broached within the tunnel, said frame having a longitudinally extending aperture formed therein, a trunnion member carried by the frame at one side of the aperture, a broach holder oscillatably supported by the trunnion and bearing, a broaching tool projectable through the aperture of the frame in the direction of the work, and means for securing the holder to the frame with the broaching tool projecting interiorly thereof for work piece engagement.

9. A broaching machine of the character described including a bed, a work carrier translatable along the bed, a frame carried by the bed, broaching members mounted on the frame in fixed relation to the frame and bed, and means for selective proper presentation of different dimentions of work pieces in operative relation to the fixed broaching tool, including a supplemental support mounted on the carrier, means for selectively holding the supplemental support in different prescribed positions with respect to the carrier in accordance with the dimension of work piece to be operated upon, and means for securing the supported work piece to the support and carrier for translation therewith with respect to the broaching tool.

10. A broaching machine of the character described including a bed, a work carrier translatable along the bed, a frame carried by the bed, broaching members mounted on the frame in fixed relation to the frame and bed, and means for selective proper presentation of different dimensions of work pieces in operative relation to the fixed broaching tool, including a supplemental support mounted on the carrier, means for selectively holding the supplemental support in different prescribed positions with respect to the carrier in accordance with the dimension of work piece to be operated upon, means for securing the supported work piece to the support and carrier for translation therewith with respect to the broaching tool, means for initiating translation of the work through a cutting stroke, and a gage device contactable with the work in advance of the broach, and connections between the gage device and the control means for preventing movement of an overdimension work piece into engagement with the broach.

11. In a machine of the character described, the combination with a translatable work carrier and a broach disposed for engagement with a work piece on the carrier, means for retaining a work piece in position on the carrier, and a controller for determining the movement of the carrier in the direction of the broach, and a gage member having portions cooperating respectively with the work retaining means and with the work and displaceable thereby, and operative connections between the gaging member and the controller for determining the effective actuation of the latter, whereby movement of the carrier with an oversize or improperly restrained work piece is prevented.

EMERY C. RAEHRS.
CARL M. BEACH.